United States Patent
Huang et al.

(10) Patent No.: US 10,923,754 B2
(45) Date of Patent: Feb. 16, 2021

(54) POLYMER BLEND PROTON EXCHANGE MEMBRANE AND METHOD FOR MANUFACTURING THE SAME

(71) Applicant: Beijing Pu Neng Century Sci & Tech Co. Ltd., Beijing (CN)

(72) Inventors: Mianyan Huang, Beijing (CN); Yanling Zhao, Beijing (CN); Linlin Li, Beijing (CN)

(73) Assignee: BEIJING PU NENG CENTURY SCI & TECH CO. LTD., Beijing (CN)

( * ) Notice: Subject to any disclaimer, the term of this patent is extended or adjusted under 35 U.S.C. 154(b) by 0 days.

(21) Appl. No.: 13/934,046

(22) Filed: Jul. 2, 2013

(65) Prior Publication Data
US 2013/0295487 A1 Nov. 7, 2013

Related U.S. Application Data

(63) Continuation of application No. 12/821,961, filed on Jun. 23, 2010, now Pat. No. 8,486,579, which is a continuation of application No. PCT/CN2009/001372, filed on Dec. 4, 2009.

(51) Int. Cl.

| | |
|---|---|
| H01M 8/10 | (2016.01) |
| H01M 8/18 | (2006.01) |
| H01M 8/20 | (2006.01) |
| H01M 8/1025 | (2016.01) |
| C08J 5/22 | (2006.01) |
| H01M 8/103 | (2016.01) |
| C08L 81/06 | (2006.01) |
| C08G 65/48 | (2006.01) |
| H01M 8/1044 | (2016.01) |
| C08L 71/00 | (2006.01) |
| H01M 8/1081 | (2016.01) |
| H01M 8/1023 | (2016.01) |
| H01M 8/1011 | (2016.01) |
| H01M 8/1027 | (2016.01) |
| H01M 8/1032 | (2016.01) |

(52) U.S. Cl.
CPC .............. *H01M 8/20* (2013.01); *C08G 65/48* (2013.01); *C08J 5/2275* (2013.01); *C08L 71/00* (2013.01); *C08L 81/06* (2013.01); *H01M 8/103* (2013.01); *H01M 8/1011* (2013.01); *H01M 8/1023* (2013.01); *H01M 8/1025* (2013.01); *H01M 8/1027* (2013.01); *H01M 8/1032* (2013.01); *H01M 8/1044* (2013.01); *H01M 8/1081* (2013.01); *H01M 8/188* (2013.01); *C08G 2261/722* (2013.01); *C08J 2381/06* (2013.01); *Y02E 60/50* (2013.01); *Y02P 70/50* (2015.11)

(58) Field of Classification Search
USPC ....... 429/465, 477, 479, 482, 483, 491–494, 429/497
See application file for complete search history.

(56) References Cited

U.S. PATENT DOCUMENTS

| | | | |
|---|---|---|---|
| 5,725,967 A | 3/1998 | Mark | |
| 6,723,757 B1 * | 4/2004 | Kerres et al. | ................... 521/27 |
| 6,914,084 B1 * | 7/2005 | Soczka-Guth | ......... B01D 71/52 |
| | | | 521/27 |
| 2002/0160272 A1 | 10/2002 | Tanaka et al. | |
| 2003/0219640 A1 * | 11/2003 | Nam | ...................... C08J 5/2218 |
| | | | 429/494 |
| 2005/0053818 A1 * | 3/2005 | St-Arnaud et al. | ............. 429/30 |
| 2006/0088750 A1 * | 4/2006 | Nobuta et al. | .................. 429/33 |
| 2006/0166067 A1 * | 7/2006 | Kiefer | ................ B01D 67/0093 |
| | | | 429/483 |
| 2007/0117958 A1 * | 5/2007 | Mohwald | ............... B01D 71/82 |
| | | | 528/220 |
| 2007/0142613 A1 | 6/2007 | Hung et al. | |
| 2007/0231556 A1 | 10/2007 | Park et al. | |
| 2008/0241626 A1 | 10/2008 | Kim et al. | |
| 2008/0248364 A1 | 10/2008 | Gourdoupi et al. | |

FOREIGN PATENT DOCUMENTS

| | | | |
|---|---|---|---|
| CN | 1312839 | 9/2001 | |
| CN | 101575446 | 11/2009 | |
| GB | 2216134 | * 3/1988 | .............. C08L 71/00 |
| KR | 1019990076812 | 10/1999 | |
| KR | 1020010106463 | 11/2001 | |
| WO | WO 2009/009525 | * 1/2009 | .............. C08L 79/08 |
| WO | 2011066674 | 6/2011 | |

OTHER PUBLICATIONS

Amphoteric ion exchange membrane synthesized by radiation-induced graft copolymerization of styrene and dimethylaminoethyl methacrylate into PVDF film for vanadium redox flow battery applications; Qiu et al.; J. Membrane Science, vol. 334. pp. 9-15 (2009).*

Luo et al., "Preparation and characterization of Nafion/SPEEK layered composite membrane and its application in vanadium redox flow battery," J. Membrane Science, 325 (2008) 553-558, available online Aug. 22, 2008 (Year: 2008).*

Properties of Ultrason® E, S, and P accessed on the web Feb. 11, 2019, available 2017 (final page) (Year: 2017).*

(Continued)

*Primary Examiner* — Amanda J Barrow
(74) *Attorney, Agent, or Firm* — Stoel Rives LLP

(57) ABSTRACT

The present invention relates to a polymer blend proton exchange membrane comprising a soluble polymer and a sulfonated polymer, wherein the soluble polymer is at least one polymer selected from the group consisting of polysulfone, polyethersulfone and polyvinylidene fluoride, the sulfonated polymer is at least one polymer selected from the group consisting of sulfonated poly(ether-ether-ketone), sulfonated poly(ether-ketone-ether-ketone-ketone), sulfonated poly(phthalazinone ether keton), sulfonated phenolphthalein poly(ether sulfone), sulfonated polyimides, sulfonated polyphosphazene and sulfonated polybenzimidazole, and wherein the degree of sulfonation of the sulfonated polymer is in the range of 96% to 118%. The present invention further relates to a method for manufacturing the polymer blend proton exchange membrane.

8 Claims, No Drawings

(56) References Cited

OTHER PUBLICATIONS

Ultrason® E, Ultrason® S, "The material of choice for demanding high temperature and filtration needs," accessed on the web Feb. 12, 2019, available 2007 (Year: 2007).*
Wootthikanokkhan et al., "Methanol Permeability and Properties of DMFC Membranes Based on Sulfonated PEEK/PVDF Blends," J. Applied Polymer Science, vol. 102, 5941-5947 (2006) (Year: 2006).*
U.S. Appl. No. 12/821,961, Non-Final Office Action, dated Apr. 29, 2011, 11 pages.
U.S. Appl. No. 12/821,961, Notice of Allowance, dated Mar. 18, 2013, 8 pages.
U.S. Appl. No. 12/821,961, Final Office Action, dated Oct. 19, 2012, 15 pages.
Gao, et al., "Study on the Preparation and Properties of Blend Membranes of Sulfonated Polyetheretherketone and polyethersulfone", Chemical Industry Times, vol. 20, No. 10, Oct. 2006, pp. 15-18.
PCT/CN2009/001372, International Search Report and Written Opinion (with English Translation), dated Sep. 9, 2010, 20 pages.
Song, et al., "Study on Conductivity and Mass Transfer of Blend Membranes of Sulfonated polyetherether ketone and polysulfone", Membrane Science and Technology, vol. 24, No. 3, Jun. 2004, pp. 15-19.
Yang, et al., "Preparation and Characterization of Poly( ether sulfone )/Sulfonated Poly(ether ether ketone) Blend Membranes", China Synthetic Resin and Plastics 24(3), 2007, pp. 51-54.

* cited by examiner

POLYMER BLEND PROTON EXCHANGE MEMBRANE AND METHOD FOR MANUFACTURING THE SAME

CROSS-REFERENCE TO RELATED APPLICATIONS

This application is a continuation of U.S. patent application Ser. No. 12/821,961 (set for issue as U.S. Pat. No. 8,486,579), entitled POLYMER BLEND PROTON EXCHANGE MEMBRANE AND METHOD FOR MANUFACTURING THE SAME, filed Jun. 23, 2010, which is a continuation of International Patent Application No. PCT/CN2009/001372, filed Dec. 4, 2009. All of the aforementioned applications are incorporated herein in their respective entireties by this reference.

TECHNICAL FIELD

The present invention relates to a polymer blend proton exchange membrane and the manufacture method thereof. In particular, the present invention relates to a polymer blend proton exchange membrane comprising a soluble polymer and a sulfonated polymer with proton exchange function. The polymer blend proton exchange membrane according to the present invention can be used in redox flow battery, particularly in vanadium redox flow battery.

BACKGROUND OF THE INVENTION

Energy crisis and environment pollution are two big problems for achieving sustainable development of global economics. An efficient way to solve the two problems is to develop more effective renewable energy such as wind energy, solar energy, tidal energy, etc. To ensure stable supply of renewable energy such as wind energy, solar energy, etc., an energy storage technology with high capacity, low cost, high efficiency, and high reliability and without pollution must be developed. Therefore, one of hot spots in the world in energy field is to develop an energy storage system with high capacity.

Among various energy storage systems with high capacity, vanadium redox battery (VRB) has been put into demonstrative operation in wind power generation, solar power generation, and the peak regulation of power grid and the like in foreign countries because of its unique advantages such as long lifetime, high reliability, low cost for operation and maintenance, and the like.

Vanadium battery uses solutions of vanadium ions with different valences as active species, wherein V4+/V5+ redox couple is used for positive electrode and V2+/V3+ redox couple is used for negative electrode. During a charge process, V4+ is changed into V5+ at positive electrode and V3+ is changed into V2+ at negative electrode. During a discharge process, V5+ is changed into V4+ at positive electrode and V2+ is changed into V3+. A cell of vanadium battery is comprised of a bipolar plate, electrodes and a separator membrane, wherein the separator membrane of vanadium battery must be able to prevent vanadium ions of different valences in the electrolytes for the positive electrode and for the negative electrode from permeating through the separator membrane but permitting the transfer of proton of hydrogen through the separator membrane. Therefore, the separator membrane should have a desirable proton conductivity as well as a high selective permeability for protons. Furthermore, the separator membrane must have a long-term chemical stability and good mechanical properties so as to meet the long life-time requirement of vanadium battery.

Currently, the common used membrane in vanadium battery is the perfluorosulfonic acid proton exchange membrane provided by DuPont Company under the trade name of Nafion. Perfluorosulfonic acid proton exchange membrane has excellent chemical stability and ion conductivity and can meet the requirement of vanadium battery. However, Perfluorosulfonic acid proton exchange membrane has poor permselectivity and vanadium ions can permeate through the membrane during the operation of vanadium battery. Thus, the self-discharge of vanadium battery occurs and the capacity of vanadium battery is reduced. Furthermore, the high cost of perfluorosulfonic acid proton exchange membrane is one of the factors obstructing the large scale commercialization of vanadium battery. Therefore, an important step for the commercialization of vanadium battery is to develop a proton exchange membranes suitable for use in vanadium battery with low cost, high chemical stability, good ion conductivity, high permselectivity and high mechanical strength.

In the field of fuel battery, in order to reduce the cost of proton exchange membrane, some non-flouorous hydrocarbon polymers are extensively studied to be used as the membrane forming material after being sulfonated. Such kinds of polymers generally have properties such as high chemical and thermal stability, and low cost, for example, polyethersulfone, poly(ether ketone), polyimide, polyphosphazene, polybenzimidazole, etc. Theses polymers are sulfonated to form proton exchange membranes, and the resulting membranes have a property that the properties thereof such as proton conductivity of the membrane depend on a degree of sulfonation of the polymer. The degree of sulfonation of the polymer shall be high enough so that an ideal conductivity is obtained. However, when the degree of sulfonation of the polymer is high, a mechanical property and dimensional and chemical stabilities of the membrane will become poor and thus the requirement of usage will not be satisfied. The proton exchange membrane used in the vanadium battery can also be made from these sulfonated polymers. However, these membranes will face a similar problem, i.e., how to compromise among degree of sulfonation, ion conductivity and chemical stability, mechanical strength, and vanadium ion permeability.

SUMMARY OF THE INVENTION

The applicant of the present invention has surprisingly found that a proton exchange membrane with excellent comprehensive properties can be manufactured by blending a polymer with high degree of sulfonation and a soluble polymer.

Therefore, one object of the present invention is to provide a polymer proton exchange membrane comprising a soluble polymer and a sulfonated polymer, wherein the soluble polymer is at least one polymer selected from the group consisting of polysulfone (PS), polyethersulfone (PES) and polyvinylidene fluoride (PVDF), the sulfonated polymer is at least one polymer selected from the group consisting of sulfonated poly(ether-ether-ketone) (SPEEK), sulfonated poly(ether-ketone-ether-ketone-ketone) (SPEKEKK), sulfonated poly(phthalazinone ether ketone) (SPPEK), sulfonated phenolphthalein poly(ether sulfone), sulfonated polyimides (SPI), sulfonated polyphosphazene and sulfonated polybenzimidazole (PBI), and wherein the degree of sulfonation of the sulfonated polymer is in the range of 96% to 118%.

In the context of this disclosure, the term "soluble polymer" means that the polymer is soluble in organic solvent. The organic solvent includes, but not limits to, one or more of dimethylacetamide, dimethylfomamide, dimethyl sulfoxide, triethyl phosphate, cyclopentanone, N-methyl-2-pyrrolidone, tetramethylurea, and propylene carbonate. Preferably, the organic solvent is selected from one or more of N,N-dimethylfomamide, N,N-dimethylacetamide, and N-methyl-2-pyrrolidone.

In a preferable embodiment of the present invention, the degree of sulfonation of the sulfonated polymer is in the range of 98% to 116%, preferably 100% to 114%, more preferably 106% to 110%.

In another preferable embodiment of the present invention, the sulfonated polymer is made from the unsulfonated polymer which has a melt viscosity in the range of 100 to 550 Pa·s, preferably 300 to 450 Pa·s, more preferably 350 to 400 Pa·s, at 300° C. to 500° C.

Preferably, the sulfonated polymer is obtained by directly dissolving the unsulfonated polymer in concentrated sulfuric acid, Nordhausen acid, or chlorosulfonic acid and sulfonating the unsulfonated polymer.

Preferably, the sulfonated polymer is prepared by directly dissolving the unsulfonated polymer in concentrated sulfuric acid and sulfonating the unsulfonated polymer. The concentrated sulfuric acid is used in an amount of 2 to 15 ml of concentrated sulfuric acid per gram of unsulfonated polymer, preferably 5 to 7 ml of concentrated sulfuric acid per gram of unsulfonated polymer.

Preferably, the sulfonated polymer is prepared by two steps: the first step is to carry out the reaction for 3 to 5 hours at 20 to 40° C.; the second step is to carry out the reaction for 1 to 4 hours at 70 to 100° C.

Preferably, the resulting sulfonated polymer is shaped through a water-cooling process, preferably through the following process: the resulting sulfonated polymer slurry is poured into a screen with 1 to 4 mm mesh size and the slurry flows into deionized water beneath the screen and the strip-like sulfonated polymer is obtained after stirring.

Preferably, the resulting strip-like sulfonated polymer is washed to remove remaining sulfuric acid, then is dried at a temperature of 100 to 120° C. for at least 1 hour, preferably at least 4 hours, so as to remove the water sufficiently.

In a further preferable embodiment of the present invention, the weight-average molecular weight of the soluble polymer is in the range of 35000 to 65000, preferably 45000 to 55000, more preferably 48000 to 52000.

In a still further preferable embodiment of the present invention, the content of the soluble polymer is 10% to 50%, preferably 13% to 38%, more preferably 18% to 35%, most preferably 22% to 32%, based on the total weight of the membrane.

The thickness of the polymer blend proton exchange membrane according to the present invention has no specific limitation, but can be determined based on the operating requirements, preferably is in the range of 30 to 200 μm, more preferably 50 to 100 μm.

Another object of the present invention is to provide a method for manufacturing a polymer proton exchange membrane, comprising the following steps:

a) dissolving a soluble polymer in an organic solvent and obtaining a uniform solution, wherein the soluble polymer is at least one polymer selected from the group consisting of polysulfone (PS), polyethersulfone (PES) and polyvinylidene fluoride (PVDF);

b) dissolving a sulfonated polymer in the solution obtained in step a) and obtaining a membrane forming solution, wherein the sulfonated polymer is at least one polymer selected from the group consisting of sulfonated poly(ether-ether-ketone), sulfonated poly(ether-ketone-ether-ketone-ketone), sulfonated poly(phthalazinone ether ketone), sulfonated phenolphthalein poly(ether sulfone), sulfonated polyimides, sulfonated polyphosphazene and sulfonated polybenzimidazole, and wherein the degree of sulfonation of the sulfonated polymer is in the range of 96% to 118%.

c) forming a membrane by tape casting the membrane forming solution, drying and heat-treating the membrane, then peeling off the membrane.

Preferably, the method according to the present invention can include a further step: d) immersing the membrane in sulfuric acid aqueous solution for a whole day to make the membrane fully protonated. Still preferably, the concentration of the sulfuric acid aqueous solution used in the step d) of the method according to the present invention is in the range of 0.5 to 1.5 M and the immersion time is in the range of 15 to 30 hours.

In a preferable embodiment according to the present invention, the organic solvent includes, but not limits to, one or more of dimethylacetamide, dimethylfomamide, dimethyl sulfoxide, triethyl phosphate, cyclopentanone, N-methyl-2-pyrrolidone, tetramethylurea, and propylene carbonate. Preferably, the organic solvent is selected from one or more of N,N-dimethylfomamide, N,N-dimethylacetamide, and N-methyl-2-pyrrolidone.

In a preferable embodiment according to the present invention, the degree of sulfonation (DS) of the sulfonated polymer is in the range of 98% to 116%, preferably 100% to 114%, more preferably 106% to 110%.

In another preferable embodiment according to the present invention, the sulfonated polymer is made from an unsulfonated polymer which has a melt viscosity in the range of 100 to 550 Pa·s, preferably 300 to 450 Pa·s, more preferably 350 to 400 Pa·s, at 300° C. to 500° C.

Preferably, the sulfonated polymer is prepared by directly dissolving the unsulfonated polymer in concentrated sulfuric acid, Nordhausen acid, or chlorosulfonic acid and sulfonating the unsulfonated polymer.

Preferably, the sulfonated polymer is prepared by directly dissolving the unsulfonated polymer in concentrated sulfuric acid and sulfonating the unsulfonated polymer. The concentrated sulfuric acid is used in an amount of 2 to 15 ml of concentrated sulfuric acid per gram of unsulfonated polymer, preferably in an amount of 5 to 7 ml of concentrated sulfuric acid per gram of unsulfonated polymer.

Preferably, the sulfonated polymer is prepared by two steps: the first step is to carry out the reaction for 3 to 5 hours at 20 to 40° C.; the second step is to carry out the reaction for 1 to 4 hours at 70 to 100° C.

Preferably, the resulting sulfonated polymer is shaped through a water-cooling process, preferably through the following process. The resulting sulfonated polymer slurry is poured into a screen with 1 to 4 mm mesh size and the slurry flows into deionized water beneath the screen, obtaining a strip-like sulfonated polymer after stirring.

Preferably, the resulting strip-like sulfonated polymer is washed to remove the remaining sulfuric acid, then is dried at a temperature of 100 to 120° C. for at least 1 hour, preferably at least 4 hours, so as to remove the water thoroughly.

In a further preferable embodiment according to the present invention, the weight-average molecular weight of the soluble polymer is in the range of 35000 to 65000, preferably 45000 to 55000, more preferably 48000 to 52000.

In a still further preferable embodiment according to the present invention, the content of the soluble polymer is 10% to 50%, preferably 13% to 38%, more preferably 18% to 35%, most preferably 22% to 32%, based on the total weight of the membrane.

The thickness of the polymer blend proton exchange membrane according to the present invention has no specific limitation, but can be determined based on the operating requirements, preferably is in the range of 30 to 200 μm, more preferably 50 to 100 μm.

The proton exchange membrane according to the present invention can be prepared by well-known membrane forming processes such as tape casting, casting, and the like without any specific requirement.

In addition to the use in redox flow battery, in particular in vanadium redox flow battery, the proton exchange membrane according to the present invention can also be used in proton exchange membrane fuel battery, in particular direct methanol fuel cell.

Preparation and Selection of Sulfonated Polymer

According to the present invention, a proton exchange membrane with excellent comprehensive properties is manufactured by blending a polymer with high degree of sulfonation and a soluble polymer. The sulfonated polymer with high degree of sulfonation has excellent proton conductivity, but has poor mechanical properties and poor dimensional stability. Without bound to any specific theory, cross-linking between the sulfonated polymer according to the present invention and the blended soluble polymer can occur, and such cross-linking will obstruct swelling of the sulfonated polymer so that the mechanical properties and dimensional stability are improved and the vanadium ion permeability through the proton exchange membrane is lowered. Preferably, the degree of sulfonation (DS) of the sulfonated polymer according to the present invention is in the range of 96% to 118%, preferably 98% to 116%, more preferably 100% to 114%, still more preferably 106% to 110%, so as to ensure the electric conductivity of the sulfonated polymer. Herein, the degree of sulfonation means the number of sulfonic acid groups contained in 100 repeating unit.

The sulfonated polymer used in the proton exchange membrane according to the present invention can be same kind of sulfonated polymers with a variety of degrees of sulfonation.

The sulfonated polymer with high DS used in the proton exchange membrane according to the present invention is made from an unsulfonated polymer which has a melt viscosity in the range of 100 to 550 Pa·s, preferably 300 to 450 Pa·s, more preferably 350 to 400 Pa·s, at 300° C. to 500° C.

Preferably, the sulfonated polymer is prepared by directly dissolving the unsulfonated polymer in concentrated sulfuric acid, Nordhausen acid, or chlorosulfonic acid and sulfonating the unsulfonated polymer.

Preferably, the sulfonated polymer is prepared by directly dissolving the unsulfonated polymer in concentrated sulfuric acid and sulfonating the unsulfonated polymer. The concentrated sulfuric acid is used in an amount of 2 to 15 ml of concentrated sulfuric acid per gram of unsulfonated polymer, preferably in an amount of 5 to 7 ml of concentrated sulfuric acid per gram of unsulfonated polymer.

Preferably, the sulfonated polymer is prepared through two steps: the first step is to carry out the reaction for 3 to 5 hours at 20 to 40° C.; the second step is to carry out the reaction for 1 to 4 hours at 70 to 100° C.

Preferably, the resulting sulfonated polymer is shaped through a water-cooling process, preferably through the following process. The resulting slurry after sulfonation reaction is poured into a screen with 1 to 4 mm mesh size and the slurry flows through the screen mesh into deionized water beneath the screen, obtaining a strip-like sulfonated polymer after stirring.

Preferably, the resulting strip-like sulfonated polymer is washed to remove the remaining sulfuric acid, then is dried at a temperature of 100 to 120° C. for at least 1 hour, preferably at least 4 hours, so as to remove the water sufficiently.

The degree of sulfonation can be controlled by selecting the amount of sulfuric acid used per unit mass of polymer, sulfonation temperature, and/or sulfonation time during sulfonation process. The degree of sulfonation can be determined by acid-base titration method.

The sulfonated polymer used in the present invention can be prepared by utilizing any other technology well known in the art.

Preparation of Blend Proton Exchange Membrane

According to the method of the present invention, a polymer blend proton exchange membrane can be prepared by the following steps.

A soluble polymer is dissolved in a certain amount of solvent with heating and stirring to obtain a uniform solution. A sulfonated polymer is dissolved in said solution with heating and stirring to obtain a uniform membrane forming solution. The membrane forming solution is poured onto a glass plate to conduct slip casting. The membrane obtained after slip casting is put into a drying oven and dried at 50 to 90° C. for 8 to 16 hours, then heat-treated at 80 to 120° C. for 2 to 6 hours. After cooling, the dried membrane together with the glass plate is immersed into deionized water and the membrane is removed from the glass plate. Then, the membrane is immersed in 0.5 to 1.5 M $H_2SO_4$ aqueous solution for 20 to 30 hours, then taken out from the $H_2SO_4$ aqueous solution, and washed with deionized water several times to remove remaining $H_2SO_4$ in the membrane before immersed into deionized water. The thickness of the proton exchange membrane is determined by controlling the thickness of tape casted membrane forming solution.

The polymer blend proton exchange membrane according to the present invention can be prepared by any other procedure similar to the process of the present invention without departing from the scope of the present invention.

The polymer blend proton exchange membrane according to the present invention is suitable for use in redox flow battery, in particular vanadium redox flow battery. The polymer blend proton exchange membrane according to the present invention has excellent proton conductivity and low vanadium ions permeability, as well as good mechanical properties, dimensional stability and chemical stability, and low cost.

The polymer blend proton exchange membrane according to the present invention has at least one of the following advantages.

1. The membrane is low cost and easy to obtain. Besides, the raw materials used in the present invention are commercial products, and the sulfonation process is easy to operate.
2. The membrane has excellent chemical and thermal stability, and high mechanical strength. Most of the polymer raw materials used in the present invention are engineering thermoplastics which have good chemical and thermal stability. The membrane has good ion conductivity because the sulfonated polymer with high degree of sulfonation is used.

3. The blended polymer selected in the present invention has the advantages such as low cost, good chemical stability, good membrane forming property.
4. The mechanical property and the dimensional stability of the membrane have been greatly improved since the swell of the blend membrane is effectively limited by the cross-linking between polymers.
5. Because of the ion passages of sulfonated polymer itself which is smaller than those of perfluorosulfonic acid membrane, as well as the cross-linking effect of the blended polymer, the capability of the blend membrane to obstruct vanadium ions from permeating the blend membrane is better than that of perfluorosulfonic acid membrane.
6. Compared with perfluorosulfonic acid membrane, the blend membrane prepared by the method according to the present invention has a much lower cost, which will definitely promote the commercialization of vanadium redox flow battery.

DETAILED DESCRIPTION OF THE INVENTION

The preparation examples of sulfonated polymer

1. The Preparation of Sulfonated Poly(Ether-Ketone)

10 g of poly(ether-ketone) (Victrex PLC, 22G, melt viscosity of 110 Pa·s at 400° C.) is added into a three-neck flask containing 120 ml of concentrated sulfuric acid (98%) at room temperature under stirring electrically. The three-neck flask is then put into a thermostatic waterbath at a set temperature of 30° C. and allowed to react for 3.5 hours. Then the temperature of the thermostatic waterbath is increased to 75° C. and maintained for 2 hours. After the reaction finishes, the resulting slurry from the reaction in the three-neck flask is poured into a screen with 2 mm mesh size made of polypropylene. The slurry flows through the screen mesh in strip shapes and comes into cool deionized water. Strip-like polymer materials are formed after the slurry contacts with cool deionized water. Then the strip-like polymer is taken out and washed with deionized water several times to remove the free acid in the polymer until the pH of the water after washing is about 7. The washed strip-like polymer is placed into a drying oven and dried at 120° C. for 4 hours until the strip-like polymer turns red-brown. The dried sulfonated poly(ether-ketone) 1 is crushed for later use. The degree of sulfonation of the sulfonated poly(ether-ketone) 1 is measured as 105% by titration method.

10 g of poly(ether-ketone) (Victrex PLC, 22G, melt viscosity of 110 Pa·s at 400° C.) is added into a three-neck flask containing 90 ml of concentrated sulfuric acid (98%) at room temperature under stirring electrically. The three-neck flask is then put into a thermostatic waterbath at a set temperature of 30° C. and allowed to react for 3.5 hours. Then the temperature of the thermostatic waterbath is increased to 65° C. and maintained for 2.5 hours. After the reaction finishes, the resulting slurry from the reaction in the three-neck flask is poured into a screen with 2 mm mesh size made of polypropylene. The slurry flows through the screen mesh in strip shapes and comes into cool deionized water. Strip-like polymer materials are formed after the slurry contacts with cool deionized water. Then the strip-like polymer is taken out and washed with deionized water several times to remove the free acid in the polymer until the pH of the water after washing is about 7. The washed strip-like polymer is placed into a drying oven and dried at 120° C. for 4 hours until the strip-like polymer turns red-brown. The dried sulfonated poly(ether-ketone) 2 is crushed for later use. The degree of sulfonation of the sulfonated poly(ether-ketone) 2 is measured as 85% by titration method.

2. Preparation of Sulfonated Poly(Ether-Ether-Ketone)

10 g of poly(ether-ether-ketone) (Victrex PLC, 381G, melt viscosity of 381 Pa·s at 400° C.) is added into a three-neck flask containing 100 ml of concentrated sulfuric acid (98%) at room temperature under stirring electrically. The three-neck flask is then put into a thermostatic waterbath at a set temperature of 35° C. and allowed to react for 3 hours. Then, the temperature of the thermostatic waterbath is increased to 75° C. and maintained for 3.5 hours. After the reaction finishes, the resulting slurry from the reaction in the three-neck flask is poured into a screen with 2 mm mesh size made of polypropylene. The slurry flows through the screen mesh in strip shapes and comes into cool deionized water. Strip-like polymer materials are formed after the slurry contacts with cool deionized water. Then, the strip-like polymer is taken out and washed with deionized water several times to remove the free acid in the polymer until the pH of the water after washing is about 7. The washed strip-like polymer is placed into a drying oven and dried at 120° C. for 4 hours until the strip-like polymer turns red-brown. The dried sulfonated poly(ether-ether-ketone) 1 is crushed for later use. The degree of sulfonation of the sulfonated poly(ether-ether-ketone) 1 is measured as 98% by titration method.

10 g of poly(ether-ether-ketone) (Victrex PLC, 381G, melt viscosity of 381 Pa·s at 400° C.) is added into a three-neck flask containing 80 ml of concentrated sulfuric acid (98%) at room temperature under stirring electrically. The three-neck flask is then put into a thermostatic waterbath at a set temperature of 35° C. and allowed to react for 3 hours. Then, the temperature of the thermostatic waterbath is increased to 65° C. and maintained for 3 hours. After the reaction finished, the resulting slurry from the reaction in the three-neck flask is poured into a screen with 2 mm mesh size made of polypropylene. The slurry flows through the screen mesh in strip shapes and comes into cool deionized water. Strip-like polymer materials are formed after the slurry contacts with cool deionized water. Then, the strip-like polymer is taken out and washed with deionized water several times to remove the free acid in the polymer until the pH of the water after washing is about 7. The washed strip-like polymer is placed into a drying oven and dried at 120° C. for 4 hours until the strip-like polymer turns red-brown. The dried sulfonated poly(ether-ether-ketone) 2 is crushed for later use. The degree of sulfonation of the sulfonated poly(ether-ketone) 2 is measured as 68% by titration method.

The polymer blend proton exchange membrane in Examples 1 to 10 and comparative Examples 1 to 4 are manufactured by using the sulfonated polymer with various degrees of sulfonation prepared according to the above described preparation examples of sulfonated polymer respectively.

Example 1

0.10 g of PVDF powder is put into a vial containing 7.8 ml of N,N-dimethylformamide and stirred magnetically at room temperature for 30 min to form a uniform solution. The solution is filtered to remove any possible small particles. 0.90 g of sulfonated poly(ether-ketone) 1 (degree of sulfonation: 105%) prepared according to the above described preparation example 1 of sulfonated polymer is weighed and added into the solution. The vial is placed into a drying oven at 60° C. to dissolve the sulfonated poly(ether-ketone) thoroughly before the vial is taken out from the drying oven. A uniform membrane forming solution of 12 wt % is obtained after stirring repeatedly. The membrane forming solution is poured onto a glass plate to conduct tape casting, then dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and immersed in deionized water for later use. The dry thickness of the resulting membrane is 85 μm, the content of PVDF is 10 wt %.

Example 2

0.15 g of PS is put into a vial containing 7.8 ml of N,N-dimethylformamide and stirred magnetically at room temperature for 30 min to form a uniform solution. The solution is filtered to remove any possible small particles. 0.85 g of sulfonated poly(ether-ketone) 1 (degree of sulfonation: 105%) prepared according to the above described preparation example 1 of sulfonated polymer is weighed and added into the solution. The vial is placed into a drying oven at 60° C. to dissolve the sulfonated poly(ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and immersed in deionized water for later use. The dry thickness of the resulting membrane is 82 μm, the content of PS is 15 wt %.

Example 3

0.20 g of PES powder is put into a vial containing 7.8 ml of N,N-dimethylformamide and stirred magnetically for 30 min to form a uniform solution. The solution is filtered to remove any possible small particles. 0.80 g of sulfonated poly(ether-ketone) 1 (degree of sulfonation: 105%) prepared according to the above described preparation example 1 of sulfonated polymer is weighed and added into the solution. The vial is placed into a drying oven at 60° C. to dissolve the sulfonated poly(ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and then immersed in deionized water for later use. The dry thickness of the resulting membrane is 81 μm, the content of PES is 20 wt %.

Example 4

Powders of 0.10 g of PVDF and 0.15 g of PES are put into a vial containing 7.8 ml of N,N-dimethylformamide and stirred magnetically for 30 min to form a uniform solution. The solution is filtered to remove any possible small particles. 0.75 g of sulfonated poly(ether-ketone) 1 (degree of sulfonation: 105%) prepared according to the above described preparation example 1 of sulfonated polymer is weighed and added into the solution. The vial is placed into a drying oven at 60° C. for 2 hours to dissolve the sulfonated poly(ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and then immersed in 1 M of sulfuric acid for a whole day. Then, the membrane is washed with deionized water repeatedly and then immersed in deionized water for later use. The dry thickness of the resulting membrane is 80 μm. The content of PVDF is 10 wt % and the content of PES is 15 wt %.

Example 5

Powders of 0.05 g of PVDF, 0.15 g of PES and 0.10 g of PS are put into a vial containing 7.8 ml of N,N-dimethylformamide and stirred magnetically for 30 min to form a uniform solution. The solution is filtered to remove any possible small particles. 0.70 g of sulfonated poly(ether-ketone) 1 (degree of sulfonation: 105%) prepared according to the above described preparation example 1 of sulfonated polymer is weighed and added into the solution. The vial is placed into a drying oven at 60° C. for 2 hours to dissolve the sulfonated poly(ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and maintained at 100° C. for 4 hours, then naturally cooled to room temperature. Then, the glass plate together with the membrane thereon is placed into deionized water. The membrane is peeled off and then immersed in 1 M of sulfuric acid for a whole day. The membrane is washed with deionized water repeatedly and then immersed in deionized water for later use. The dry thickness of the resulting membrane is 80 μm. The content of PVDF is 5 wt %, the content of PES is 15 wt % and the content of PS is 10 wt %.

Example 6

0.10 g of PVDF powder is put into a vial containing 7.8 ml of N,N-dimethylformamide and stirred magnetically at room temperature for 30 min to form a uniform solution. The solution is filtered to remove any possible small particles.

0.90 g of sulfonated poly(ether-ether-ketone) 1 (degree of sulfonation: 98%) prepared according to the above described preparation example 2 of sulfonated polymer is weighed and added into the solution. The vial is placed into a drying oven at 60° C. to dissolve the sulfonated poly(ether-ether-ketone) thoroughly before the vial is taken out from the drying oven. A uniform membrane forming solution of 12 wt % is obtained after stirring repeatedly. The membrane forming solution is poured onto a glass plate to conduct tape casting, then dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and immersed in deionized water for later use. The dry thickness of the resulting membrane is 85 μm, the content of PVDF is 10 wt %.

Example 7

0.15 g of PS is put into a vial containing 7.8 ml of N,N-dimethylformamide and stirred magnetically at room temperature for 30 min to form a uniform solution. The solution is filtered to remove any possible small particles. 0.85 g of sulfonated poly(ether-ether-ketone) 1 (degree of sulfonation: 98%) prepared according to the above described preparation example 2 of sulfonated polymer is weighed and added into the solution. The vial is placed into a drying oven at 60° C. to dissolve the sulfonated poly(ether-ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and immersed in deionized water for later use. The dry thickness of the resulting membrane is 82 μm, the content of PS is 15 wt %.

Example 8

0.20 g of PES powder is put into a vial containing 7.8 ml of N,N-dimethylformamide and stirred magnetically for 30 min to form a uniform solution. The solution is filtered to remove any possible small particles. 0.80 g of sulfonated poly(ether-ether-ketone) 1 (degree of sulfonation: 98%) prepared according to the above described preparation example 2 of sulfonated polymer is weighed and added into the solution. The vial is placed into a drying oven at 60° C. for 2 hours to dissolve the sulfonated poly(ether-ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and then immersed in deionized water for later use. The dry thickness of the resulting membrane is 83 μm, the content of PES is 20 wt %.

Example 9

Powders of 0.10 g of PVDF and 0.15 g of PES are put into a vial containing 7.8 ml of N,N-dimethylformamide and stirred magnetically for 30 min to form a uniform solution. The solution is filtered to remove any possible small particles. 0.75 g of sulfonated poly(ether-ether-ketone) 1 (degree of sulfonation: 98%) prepared according to the above described preparation example 2 of sulfonated polymer is weighed and added into the solution. The vial is placed into a drying oven at 60° C. for 2 hours to dissolve the sulfonated poly(ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and then immersed in 1 M of sulfuric acid for a whole day. Then, the membrane is washed with deionized water repeatedly and then immersed in deionized water for later use. The dry thickness of the resulting membrane is 80 μm. The content of PVDF is 10 wt % and the content of PES is 15 wt %.

Example 10

Powders of 0.05 g of PVDF, 0.15 g of PES and 0.10 g of PS are put into a vial containing 7.8 ml of N,N-dimethylformamide and stirred magnetically for 30 min to form a uniform solution. The solution is filtered to remove any possible small particles. 0.70 g of sulfonated poly(ether-ether-ketone) 1 (degree of sulfonation: 98%) prepared according to the above described preparation example 2 of sulfonated polymer is weighed and added into the solution. The vial is placed into a drying oven at 60° C. for 2 hours to dissolve the sulfonated poly(ether-ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and maintained at 100° C. for 4 hours, then naturally cooled to room temperature. Then, the glass plate together with the membrane thereon is placed into deionized water. The membrane is peeled off and then immersed in 1 M of sulfuric acid for a whole day. The membrane is washed with deionized water repeatedly and then immersed in deionized water for later use. The dry thickness of the resulting membrane is 80 μm. The content of PVDF is 5 wt %, the content of PES is 15 wt % and the content of PS is 10 wt %.

Comparative Example 1

0.10 g of PVDF powder is put into a vial containing 7.8 ml of N,N-dimethylformamide and stirred magnetically at room temperature for 30 min to form a uniform solution. The solution is filtered to remove any possible small particles. 0.90 g of sulfonated poly(ether-ketone) 2 (degree of sulfonation: 85%) prepared according to the above described preparation example 1 of sulfonated polymer is weighed and added into the solution. The vial is placed into a drying oven at 60° C. to dissolve the sulfonated poly(ether-ketone) thoroughly before the vial is taken out from the drying oven. A uniform membrane forming solution of 12 wt % is obtained after stirring repeatedly. The membrane forming solution is poured onto a glass plate to conduct tape casting. The membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and immersed in deionized water for later use. The dry thickness of the resulting membrane is 85 μm, the content of PVDF is 10 wt %.

Comparative Example 2

Powders of 0.05 g of PVDF, 0.15 g of PES and 0.10 g of PS are put into a vial containing 7.8 ml of N,N-dimethylformamide and stirred magnetically for 30 min to form a uniform solution. The solution is filtered to remove any possible small particles. 0.80 g of sulfonated poly(ether-ketone) 2 (degree of sulfonation: 85%) prepared according to the above described preparation example 1 of sulfonated polymer is weighed and added into the solution. The vial is placed into a drying oven at 60° C. to dissolve the sulfonated poly(ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and maintained at 100° C. for 4 hours, then naturally cooled to room temperature. Then, the glass plate together with the membrane thereon is placed into deionized water. The membrane is peeled off and then immersed in 1 M of sulfuric acid for a whole day. The membrane is washed with deionized water repeatedly and then immersed in deionized water for later use. The dry thickness of the resulting membrane is 81 μm. The content of PVDF is 5 wt %, the content of PES is 15 wt % and the content of PS is 10 wt %.

Comparative Example 3

0.10 g of PVDF powder is put into a vial containing 7.8 ml of N,N-dimethylformamide and stirred magnetically at room temperature for 30 min to form a uniform solution. The solution is filtered to remove any possible small particles. 0.90 g of sulfonated poly(ether-ether-ketone) 2 (degree of sulfonation: 68%) prepared according to the above described preparation example 2 of sulfonated polymer is weighed and added into the solution. The vial is placed into a drying oven at 60° C. to dissolve the sulfonated poly(ether-ether-ketone) thoroughly before the vial is taken out from the drying oven. A uniform membrane forming solution of 12 wt % is obtained after stirring repeatedly. The membrane forming solution is poured onto a glass plate to conduct tape casting. The membrane formed on the glass plate is dried at 60° C. for 12 hours and heat-treated at 100° C. for 4 hours, then naturally cooled to room temperature. Then, the glass plate together with the membrane thereon is placed into deionized water. The membrane is peeled off and immersed in 1 M of sulfuric acid for a whole day. Then, the membrane is washed with deionized water repeatedly and immersed in deionized water for later use. The dry thickness of the resulting membrane is 85 μm, the content of PVDF is 10 wt %.

Comparative Example 4

Powders of 0.05 g of PVDF, 0.15 g of PES and 0.10 g of PS are put into a vial containing 7.8 ml of N,N-dimethylformamide and stirred magnetically for 30 min to form a uniform solution. The solution is filtered to remove any possible small particles. 0.80 g of sulfonated poly(ether-ether-ketone) 2 (degree of sulfonation: 85%) prepared according to the above described preparation example 2 of sulfonated polymer is weighed and added into the solution. The vial is placed into a drying oven at 60° C. to dissolve the sulfonated poly(ether-ether-ketone) thoroughly before the vial is taken out from the drying oven. Then, a uniform membrane forming solution of 12 wt % is obtained after stirring repeatedly and dispersing with ultrasound. The membrane forming solution is poured onto a glass plate to conduct tape casting. Then the membrane formed on the glass plate is dried at 60° C. for 12 hours and maintained at 100° C. for 4 hours, then naturally cooled to room temperature. Then, the glass plate together with the membrane thereon is placed into deionized water. The membrane is peeled off and then immersed in 1 M of sulfuric acid for a whole day. The membrane is washed with deionized water repeatedly and then immersed in deionized water for later use. The dry thickness of the resulting membrane is 81 μm. The content of PVDF is 5 wt %, the content of PES is 15 wt % and the content of PS is 10 wt %.

The following property tests have been made for Nafion 115 (available commercially from DuPont Company, USA) and the polymer blend proton exchange membranes prepared according to the Examples 1 to 10 and Comparative Examples 1 to 4.

1. Vanadium Ion Permeability Test of Proton Exchange Membrane

The vanadium ion permeability of proton exchange membrane is conducted with a permeation cell. A proton exchange membrane is sandwiched between two half cells of the permeation cell, wherein one half cell contains a electrolyte solution of vanadium battery and the other half cell contains a sulfuric acid aqueous solution with the same concentration as that of the electrolyte solution. On testing, the two half cells are stirred simultaneously by electric stirrer. After a certain time, the vanadium ions in the half cell containing the electrolyte solution will enter into the half cell containing the sulfuric acid solution by permeating the membrane, resulting in the change of the light absorbency of the sulfuric acid aqueous solution. The relative content of vanadium ions in the sulfuric acid aqueous solution side can be determined by measuring the light absorbency of the sulfuric acid aqueous solution with ultraviolet-visible spectrometer, thus determining the vanadium ions permeability of various membranes. In the specification, vanadium ions permeability is indicated by the light absorbency of the sulfuric acid aqueous solution after 100 hours.

2. Swell Property Test of Proton Exchange Membrane

Area change rate (ΔS) is used to indicate the swell property of proton exchange membrane. At room temperature, the surface area of wet membrane ($S_w$) is measured after a rectangular membrane sample is immersed in water for 12 hours. The surface area of dry membrane ($S_d$) is measured after the above wet membrane is dried at 80° C. for 12 hours. The area change rate ΔS is calculated based on the following equation:

$$\Delta S = (S_w - S_d)/S_d \times 100\%$$

3. Mechanical Property Test of Proton Exchange Membrane

The mechanical properties of proton exchange membrane are tested according to GB1039-79 and GB 1040-79.

4. Surface Resistance Test of Proton Exchange Membrane

The surface resistance of proton exchange membrane is tested with a battery internal resistance tester using alternating current method. On testing, the membrane is sandwiched between the two half cells of a permeation cell. Two graphite electrode plates are respectively fixed on the two surfaces opposite to the surfaces on which the membrane is sandwiched. A $V^{3.5+}$ electrolyte solution (1.7 M $V^{3.5+}$, 2.6 M $H_2SO_4$) is added into the two half cells up to a predetermined height. After the electrolyte solution become stable, the internal resistance $R_2$ of the permeation cell, i.e. the internal resistance between the two graphite electrode plates is measured with the internal resistance tester. The internal resistance $R_1$ of the permeation cell when the membrane is not sandwiched between the two half cells of the permeation cell is measured under the same conditions. The effective test area of the membrane or the opening area of the permeation cell is S. The surface resistance of the membrane R ($\Omega \cdot cm^2$) is calculated according to the equation $R=(R_1-R_2) \times S$.

The test results of proton exchange membrane are listed in Table 1.

TABLE 1

| Type of Membrane | Thickness (μm) | Breaking Strength (MPa) | Ultimate Enlongation (%) | Swelling Ratio ΔS (%) | Light Absorbency of sulfuric acid solution side after 100 hours | Surface Resistance@25□ ($\Omega \cdot cm^2$) |
|---|---|---|---|---|---|---|
| Nafion 115 | 125 | 31 | 446.04 | 25 | 0.202 | 0.42 |
| Example 1 | 85 | 45 | 282.65 | 22 | 0.086 | 0.38 |
| Example 2 | 82 | 43 | 202.24 | 17 | 0.073 | 0.45 |
| Example 3 | 81 | 47 | 126.09 | 12 | 0.059 | 0.48 |
| Example 4 | 80 | 38 | 119.50 | 8 | 0.050 | 0.52 |
| Example 5 | 80 | 40 | 108.21 | 6 | 0.047 | 0.60 |
| Example 6 | 85 | 39 | 232.30 | 23 | 0.077 | 0.39 |
| Example 7 | 82 | 37 | 208.69 | 18 | 0.065 | 0.41 |
| Example 8 | 83 | 38 | 126.48 | 14 | 0.056 | 0.47 |
| Example 9 | 80 | 40 | 118.06 | 8 | 0.050 | 0.56 |
| Example 10 | 80 | 34 | 107.88 | 5 | 0.043 | 0.62 |
| Comparative Example 1 | 85 | 42 | 261.25 | 22 | 0.081 | 0.43 |
| Comparative Example 2 | 81 | 31 | 97.18 | 8 | 0.045 | 0.95 |
| Comparative Example 3 | 85 | 40 | 201.40 | 25 | 0.072 | 0.48 |
| Comparative Example 4 | 81 | 30 | 67.66 | 10 | 0.042 | 0.98 |

In Table 1, it is indicated that the polymer blend proton exchange membrane according to the present invention (Examples 1 to 10) exhibits higher mechanical strength, higher dimensional stability and lower vanadium ion permeability, compared with Nafion 115.

Based on the Examples 1 to 10 of the present invention, the dimensional stability is improved and vanadium ion permeability is lowered as the amount of the soluble polymer blended is increased.

Moreover, in contrast with the comparative examples 1 to 4 in which the degree of sulfonation of the sulfonated polymer is beyond the scope of the present invention, higher electric conductivity can be obtained by blending more soluble polymer in the polymer blend proton exchange membrane prepared in Examples 1 to 10 according to the present invention. For example, the polymer blend proton exchange membranes prepared in Examples 5 and 10 still have high electric conductivity although the amount of the blended soluble polymer reaches 30%. In contrast, the electric conductivity of the membrane in comparative examples 2 and 4 decreases dramatically, i.e. the surface resistance increases dramatically.

Thus, according to the present invention, a polymer blend proton exchange membrane with excellent combination of properties can be obtained by blending a specific soluble polymer in a polymer that is obtained by sulfonating a polymer not containing fluorine. In particular, the polymer blend proton exchange membrane according to the present invention has an excellent compromise among mechanical property, dimensional stability, vanadium ion permeability and electric conductivity.

Although the present invention has been described in connection with the specific examples for illustrative purposes, those skilled in the art will appreciate that various modifications, additions and substitutions are possible after reading the specification. The present invention is intended to cover all of these modifications, additions and substitutions within the scope of the accompanying claims.

What is claimed is:

1. A vanadium redox battery comprising:
    (i) at least one vanadium ion; and
    (ii) a polymer blend proton exchange membrane comprising a blend of:
        (a) a soluble polymer comprising a polymer selected from the group consisting of polysulfone, polyethersulfone and polyvinylidene fluoride, a weight-average molecular weight of the soluble polymer in the range of 35,000 to 65,000 grams per mole (g/mol), wherein the soluble polymer is present in an amount of 10% to 50% based on the total weight of the polymer blend proton exchange membrane; and
        (b) a sulfonated polymer comprising a polymer selected from the group consisting of sulfonated poly(ether-ether-ketone) having a degree of sulfonation of 98% and sulfonated poly(ether-ketone) having a degree of sulfonation of 105%, and
    wherein the soluble polymer and sulfonated polymer are cross-linked.

2. The vanadium redox battery according to claim 1, wherein the thickness of the polymer blend proton exchange membrane is selected from 30 to 200 μm or 50 to 100 μm.

3. The vanadium redox battery according to claim 1, wherein the weight-average molecular weight of the soluble polymer is in the range of 45,000 to 55,000 g/mol.

4. The vanadium redox battery according to claim 1, wherein the weight-average molecular weight of the soluble polymer is in the range of 48,000 to 52,000 g/mol.

5. A polymer blend proton exchange membrane comprising a blend of:
   (a) a soluble polymer comprising a polymer selected from the group consisting of polysulfone, polyethersulfone, and polyvinylidene fluoride, a weight-average molecular weight of the soluble polymer in the range of 35,000 to 65,000 grams per mole (g/mol), wherein the soluble polymer is present in an amount of 10% to 50% based on the total weight of the polymer blend proton exchange membrane; and
   (b) a sulfonated polymer comprising a polymer selected from the group consisting of sulfonated poly(ether-ether-ketone) having a degree of sulfonation of about 98% and sulfonated poly(ether-ketone) having a degree of sulfonation of about 105%,
   wherein the soluble polymer and sulfonated polymer are cross-linked.

6. The polymer blend proton exchange membrane according to claim 5, wherein the weight-average molecular weight of the soluble polymer is in the range of 45,000 to 55,000 g/mol.

7. The polymer blend proton exchange membrane according to claim 5, wherein the weight-average molecular weight of the soluble polymer is in the range of 48,000 to 52,000 g/mol.

8. The polymer blend proton exchange membrane according to claim 5, wherein the thickness of the polymer blend proton exchange membrane is selected from 30 to 200 μm or 50 to 100 μm.

* * * * *